United States Patent [19]

Sami et al.

[11] 4,423,485

[45] Dec. 27, 1983

[54] ELECTRIC CONTROL APPARATUS FOR FUEL INJECTION PUMPS

[75] Inventors: Hiroshi Sami, Numazu; Osamu Ito, Toyota; Shizuo Kawai, Kariya; Nobuhito Hobo, Inuyama; Teruo Nishio, Anjo, all of Japan;

[73] Assignees: Nippondenso Co., Ltd., Kariya; Toyota Jidosha Kogyo Kabushiki Kaisha, Toyota, both of Japan

[21] Appl. No.: 249,866

[22] Filed: Apr. 1, 1981

[30] Foreign Application Priority Data

Apr. 4, 1980 [JP] Japan .................................. 55-44967

[51] Int. Cl.³ ........................ F02M 39/00; F02D 5/02
[52] U.S. Cl. ............................... 364/431.05; 123/357; 123/446; 123/480
[58] Field of Search ...................... 364/431.05, 431.06; 123/357, 358, 446, 480

[56] References Cited

U.S. PATENT DOCUMENTS

| | | | |
|---|---|---|---|
| 3,821,896 | 7/1974 | Grob | 73/861.77 |
| 3,867,918 | 2/1975 | Williams et al. | 123/357 |
| 3,873,814 | 3/1975 | Mirdadian | 73/861.77 |
| 3,973,537 | 8/1976 | Williams et al. | 123/358 X |
| 4,294,211 | 10/1981 | Stumpp et al. | 123/357 |
| 4,343,274 | 8/1982 | Butscher | 123/357 |

*Primary Examiner*—Felix D. Gruber
*Attorney, Agent, or Firm*—Cushman, Darby & Cushman

[57] ABSTRACT

An electric control apparatus for a fuel injection pump comprises a fuel flow sensor for detecting the net quantity of fuel supplied to the fuel injection pump, operating condition sensors for detecting operating condition parameters of an engine, a servo device for driving a fuel injection quantity controlling element of the fuel injection pump which controls the fuel injection quantity of the fuel injection pump, and an electric control circuit for receiving detection signals from the fuel flow sensor and the operating condition sensors, computing the actual fuel injection quantity and the desired fuel injection quantity, and determining an error between the computed actual fuel injection quantity and desired fuel injection quantity to drive the fuel injection quantity controlling element of the fuel injection pump through the servo device in accordance with an error representing signal, thereby controlling the actual fuel injection quantity at the desired fuel injection quantity.

By ensuring high detection accuracy of the fuel flow sensor, it is possible to accomplish high precision control of the fuel injection quantity without utilizing the position of a moving part of the fuel injection quantity controlling element of the fuel injection pump.

6 Claims, 17 Drawing Figures

ELECTRIC CONTROL APPARATUS FOR FUEL INJECTION PUMPS

BACKGROUND OF THE INVENTION

1. Field of the Invention

The present invention relates to an electric control apparatus for fuel injection pumps, which is so designed that the desired value of the fuel injection quantity is computed electrically and also the net fuel flow through the fuel injection pump is detected by an electric fuel flow sensor, thereby controlling the fuel injection quantity of the fuel injection pump.

2. Description of the Prior Art

A prior art fuel injection quantity control apparatus for fuel injection pumps, which includes an electric computing unit, is so designed that a position of a fuel controlling element which is estimated to provide a predetermined fuel injection quantity corresponding to engine operating conditions is computed as a desired position (signal) and the actual position of the fuel controlling element is also computed as an actual position (signal), so that the error between the actual position signal and the desired position signal is detected to drive an electric servo device, thereby operating the fuel controlling element.

This known apparatus does not directly detect a fuel injection quantity itself which is the primary object of its control, but it employs an indirect fuel injection quantity detecting system in which the position of the fuel controlling element is detected by a position sensor to determine the fuel injection quantity from the detected position. Thus, there is a disadvantage that, no matter how the detection accuracy of the position sensor is improved, the effect of improving the fuel injection quantity detection accuracy is not obtainable because of variations in the fuel injection quantity characteristic at the respective positions of the fuel controlling element such as a fuel control rack, etc. of each fuel injection pump.

Another disadvantage is that, even with respect to the same fuel injection pump, the fuel injection quantity characteristics at the respective positions of the fuel controlling element may vary depending on the pump speeds and hence the engine speeds and besides the variations with time occur as the service time increases, thus making it impossible to determine the actual fuel injection quantity only by the position of the fuel controlling element.

SUMMARY OF THE INVENTION

The present invention has been made with a view to overcoming the foregoing disadvantages of the prior art apparatus.

It is therefore the object of this invention to provide an electric control apparatus for fuel injection pumps which is so designed that the net quantity of fuel flowing into a delivery cylinder of a fuel injection pump is detected by a fuel flow sensor to generate an electric net fuel flow signal, and an electric control circuit computes an actual fuel injection quantity and a desired fuel injection quantity, whereby the fact that the net fuel flow quantity can be considered practically as the actual fuel injection quantity makes it possible to control the actual fuel injection quantity in accordance with the desired fuel injection quantity, and the assurance of the desired accuracy of the fuel flow sensor makes it possible to control the actual fuel injection quantity with high precision without utilizing the position of the fuel injection pump fuel controlling element for the purpose of detecting the fuel injection quantity.

BRIEF DESCRIPTION OF THE DRAWINGS

In the drawings, like reference numerals refer to like parts.

DESCRIPTION OF THE PREFERRED EMBODIMENTS

Preferred embodiments of the present invention will now be described with reference to the accompanying drawings.

Figure 1:
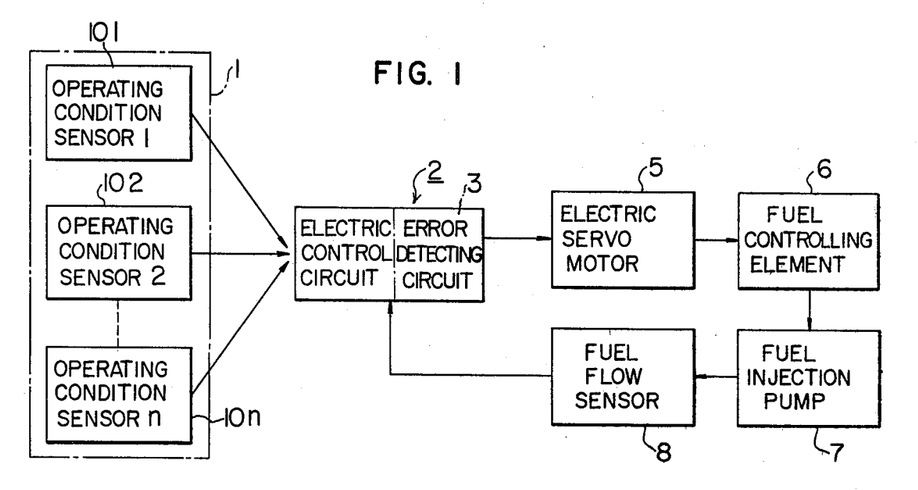
FIG. 1 is a block diagram schematically showing the overall construction of the electric control apparatus of an embodiment of this invention.

Referring firstly to FIG. 1 showing the construction of an embodiment of this invention, numeral 1 designates a sensor group including various operating condition sensors 101, 102, . . ., 10n for detecting the operating conditions of an engine, such as, the engine rotational speeds, accelerator position, cooling water temperatures, etc., as electric signals. Numeral 2 designates an electric control circuit including a desired fuel injection quantity signal generator for generating an electric signal to determine a desired value of fuel injection quantity, an actual fuel injection quantity signal generator for generating an electric signal to determine an actual fuel injection quantity, and an error detecting circuit 3 for comparing the desired fuel injection quantity signal with the fuel injection pump net fuel flow signal (the actual fuel injection quantity signal) to generate a drive voltage corresponding to an error between the two signals.

Numeral 5 designates an electric servo motor responsive to the drive voltage generated by the error detecting circuit 3 to generate an actuation force for mechanical actuation purposes. Numeral 6 designates a fuel controlling element which indicates a fuel control rack or a lever operatively associated with the fuel control rack in the case of the Bosch in-line type fuel injection pump, or a spill-ring or a lever operatively associated with the spill-ring in the case of the distributor type fuel injection pump. Numeral 7 designates a fuel injection pump for intermittently generating a high fuel pressure for fuel injection such that fuel is injected into the respective engine cylinders via fuel supply lines and fuel injection nozzles disposed respectively at the engine cylinders. Numeral 8 designates a fuel flow sensor for detecting the net fuel flow to generate an electric signal indicative of the net quantity of fuel fed into the housing of the fuel injection pump 7. Where there are provided a fuel supply passage for supplying fuel from a fuel tank into the pump housing via a lower pressure pump section and a fuel return passage for returning fuel back to the fuel tank via an orifice, a check valve, etc., the flow sensor 8 must detect a net fuel flow indicative of the difference between a fuel flow through the fuel supply passage and a fuel flow through the fuel return passage. The resultant detection signal indicative of the net fuel flow is then applied to the electric control circuit 2 which in turn compares the detection signal with the desired fuel injection quantity signal to detect an error.

Figure 2:
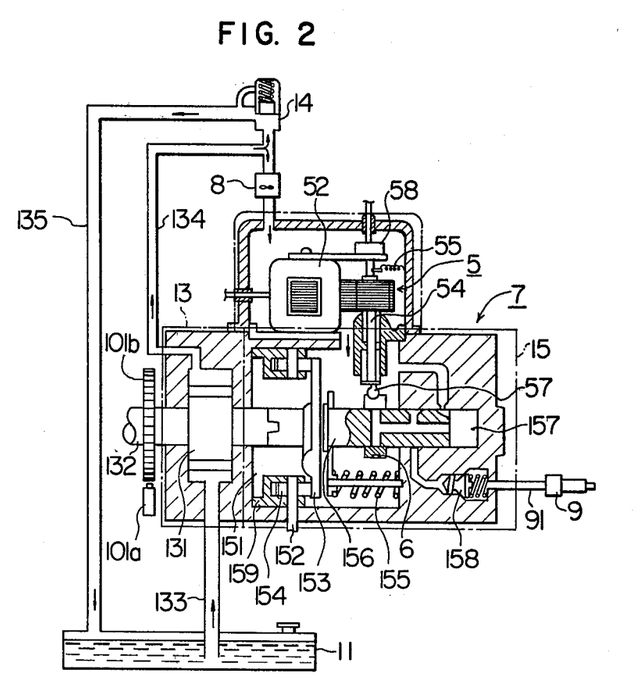
FIG. 2 is a sectional view showing the construction of a distributor type fuel injection pump which is controlled by the electric control apparatus of the embodiment of this invention shown in FIG. 1.

FIG. 2 shows an exemplifying arrangement of a fuel supply system and the Figure shows the low pressure pump section and the high pressure pump section of the Bosch VE-type fuel injection pump. In the Figure, numeral 7 designates a VE-type fuel injection pump, and 11 a fuel tank. Numeral 13 designates the low pressure pump section of the injection pump 7 including a vane pump 131. Numeral 14 designates a relief valve, and 15 a high pressure pump section of the fuel injection pump 7. Numeral 5 designates the electric servo motor for controlling the fuel injection quantity of the fuel injection pump 7, 8 a fuel flow sensor, and 9 fuel injection nozzle.

Figure 3A:
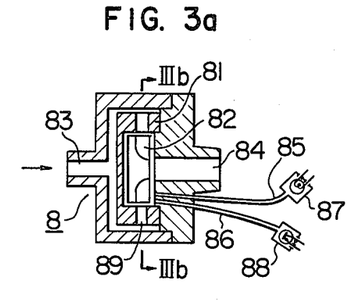
FIGS. 3a and 3b are explanatory sectional views illustrating principal parts of the fuel flow sensor for use in the electric control apparatus shown in FIG. 1.
Figure 3B:
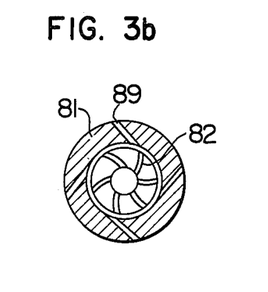

With the construction described above, the low pressure pump section 13 of the fuel injection pump 7 includes the vane pump 131 which is driven by an engine crankshaft 132 so that fuel is taken in from the fuel tank 11 via an inlet passage 133 and then delivered into a delivery passage 134, thus generating a low fuel pressure of several atmospheric pressures within the housing of the electric servo motor 5. A portion of the fuel delivered by the vane pump 131 is returned through the relief valve 14 to the fuel tank 11 via a relief passage 135. The remainder of the delivered fuel is fed into a fuel reservoir 151 inside the pump housing from the delivery passage 134 through the fuel flow sensor 8 which measures the net fuel supply. The fuel flow sensor 8 generates an electric signal corresponding to the flow velocity of the fuel flowing through the fuel flow sensor 8. As seen from an example of the fuel flow sensor 8 illustrated by FIG. 3a and FIG. 3b which is a sectional view along the line IIIb-IIIb in FIG. 3a, the fuel fed into the fuel flow sensor 8 through an inlet 83 flows from the outer peripheral portion toward the central portion via spiral nozzles 89 provided in a nozzle ring 81, and the resultant swirling fuel stream rotates an impeller 82 arranged rotatably at the center of the nozzle ring 81. The number of revolutions of the impeller 82 is proportional to the flow rate, if the flow rate of the fuel flowing into an outlet 84 from the inlet 83 is greater than a predetermined value. Thus, the number of revolutions of the impeller 82 is converted into an electric signal by a photoelectric converter which is so designed that light is projected onto the mark on the impeller 82 from a light source 87 through an optical fiber 85, and the light reflected therefrom is received by a photo transistor 88 through an optical fiber 86, whereby a fuel flow signal is generated in the form of a pulse voltage having a repetition frequency proportional to the fuel flow.

Figure 4:
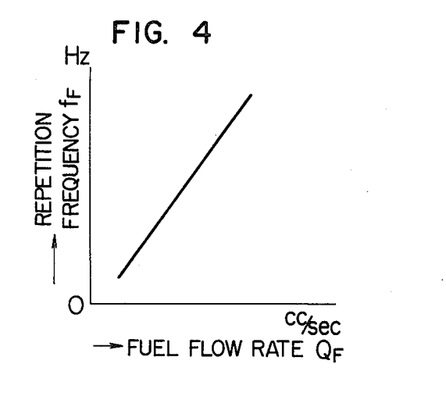
FIGS. 4, 5, 7 and 9 are characteristic curve diagrams useful for explaining the operation of the apparatus according to this invention.
Figure 5:
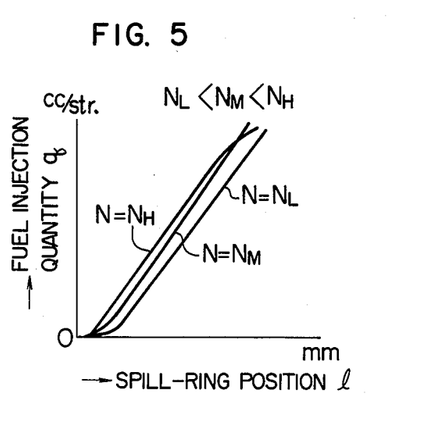

In FIG. 4 showing a characteristic of the fuel flow sensor 8, the abscissa represents the fuel flow rate $Q_F$ (cc/sec) and the ordinate represents the repetition frequency $f_F$ (Hz) of the generated pulse signal. In the illustrated example of the high pressure pump section 15 of the known Bosch VE-type distributor pump, a return spring 155 urges a plunger 156 against a face cam 153 driven by the drive shaft 132 and causes the face cam 153 to rotate in contact with rollers 154, whereby the plunger 156 is caused to make a reciprocating motion and a rotary motion simultaneously. Thus, the plunger 156 is made to apply a high injection pressure on the fuel in a pressure chamber 157 and to distribute the high pressure fuel, thereby injecting the high pressure fuel into each of the engine cylinders via a delivery valve 158, a fuel injection pipe 91 and the fuel injection nozzle 9. Here, the fuel injection quantity is determined by the position of the spill-ring 6 on the plunger 156 and the position of the spill-ring 6 is controlled by the electric servo motor 5 which drives the spill-ring 6. FIG. 5 is a characteristic diagram showing the relationship between the position l in mm of the spill-ring 6 and the fuel injection quantity q in cc per injection stroke with the engine rotational speed N as a parameter, where $N_L < N_M < N_H$. The timing of fuel injection is determined by the position of a roller ring 159 which supports the rollers 154, and the position of the roller ring 159 is adjusted by a timer actuator which actuates a roller pin 152. In FIG. 2 the timer actuator is omitted and is not shown.

Figure 6:
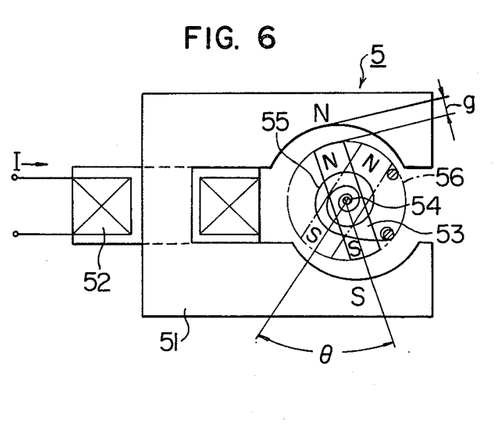
FIG. 6 is an explanatory diagram schematically showing the construction of the principal parts of the electric servo motor in FIG. 1.
Figure 7:
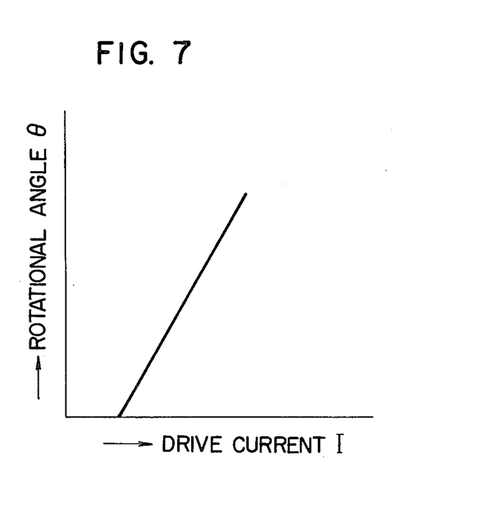

In the present embodiment the fuel injection quantity controlling electric servo motor 5 comprises a movable core type rotary solenoid, and its detailed construction is shown in FIG. 6. In the Figure, numeral 51 designates a stator, 52 a stator exciting coil, and 53 a rotor supported rotatably with its center shaft 54. Numeral 55 designates a rotor return spring. When no current flows through the exciting coil 52, the rotor 53 stays abutting against a stopper 56 at the reference position where the rotational angle of the rotor 53 is zero. When a drive current I flows through the exciting coil 52, a turning force appears in the rotor 53 due to an electromagnetic force, so that the rotor 53 is made to rotate to a position $\theta$ where the force of the return spring 55 balances against the turning torque of the rotor 53 to establish a state of equilibrium. By selecting the pole shape of the stator 51 so that the average gap g between the rotor 53 and the stator 51 increases as the rotational angle $\theta$ of the rotor 53 increases and by selecting a suitable spring constant for the return spring 55, the relationship between the drive current I and the rotational angle $\theta$ is made linear as shown in FIG. 7. The amount of operation of the electric servo motor 5 or the rotational angle $\theta$ of the center shaft 54 is detected by a potentiometer 58 connected directly to the shaft 54, and it is fed back to the electric control circuit to be used as a servo system stabilizing signal. This embodiment differs from the known apparatus of this kind in that a lever position signal is not detected as a substitution signal for representing the actual fuel injection quantity. The shaft 54 is connected by way of an eccentric arm 57 to the spill-ring 6 of the fuel injection pump 7, and thus it is made possible to control the fuel injection quantity in accordance with the drive current.

Figure 8:
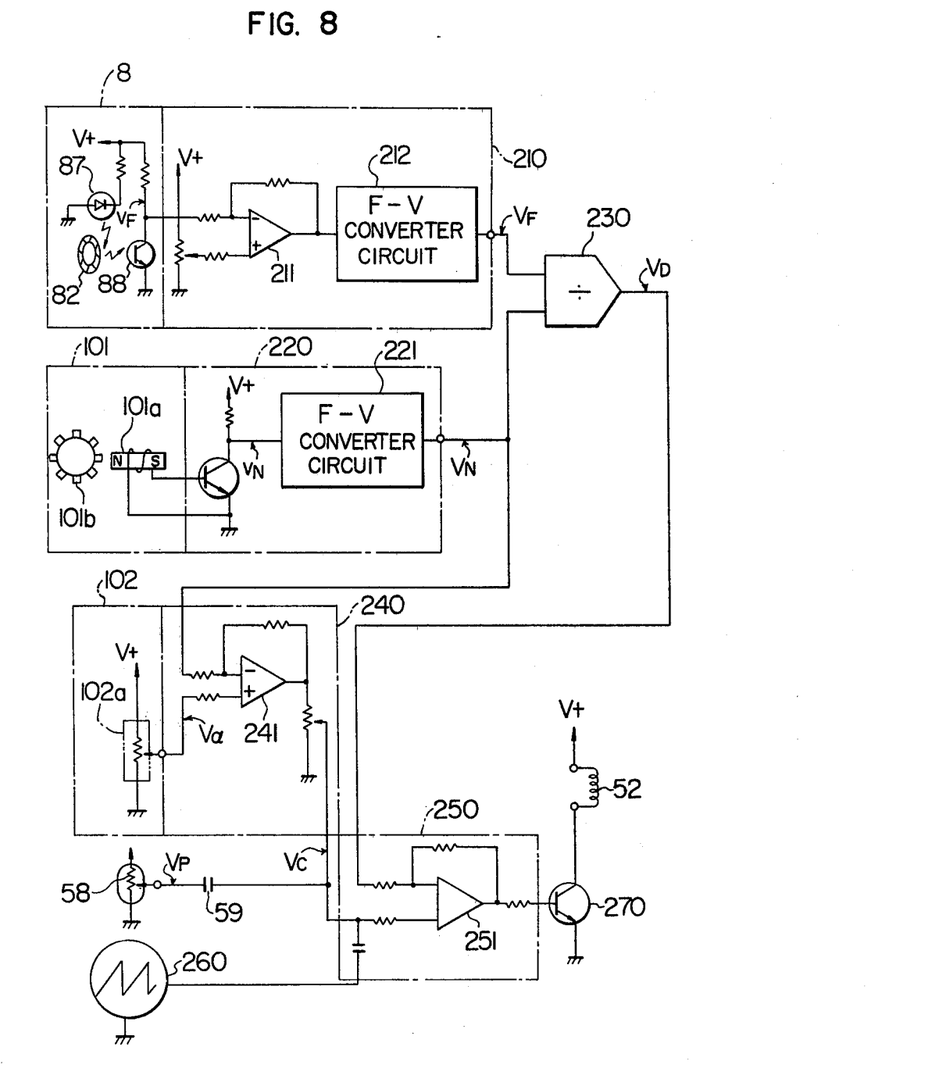
FIG. 8 is a circuit diagram showing an example of the electric control circuit in FIG. 1.

An example of the electric control circuit is shown in FIG. 8. FIG. 8 shows by way of example the electric control circuit comprising analog type computing circuitry in which numerals 101 and 102 designate respectively the engine rotational speed sensor and the accelerator position sensor both of which are operating condition sensors. Numeral 8 designates the fuel flow sensor, 210 a fuel flow signal generator, 220 an engine speed signal generator, 230 a divider, 240 a desired fuel injection quantity signal generator, 250 an error discriminator, 260 a sawtooth generator, and 52 the exciting coil of the electric servo motor 5.

The fuel flow signal generator 210 is designed so that when the fuel flow sensor 8 converts the revolutions of the impeller 82 corresponding to the fuel injection quantity of the fuel injection pump 7 into an electric signal through a photoelectric converting unit including the light source or light-emitting diode 87 and the photo transistor 88 thereby to generate a pulse signal $v_F$ having a repetition frequency corresponding to the fuel injection quantity per unit time. Then, a fuel flow signal $V_F$ indicative of a voltage proportional to the fuel injection quantity per unit time is generated through an amplifier 211 and a known type of F-V converter circuit 212. The engine speed signal generator 220 is such that, when the rotation of a timing gear 101b operatively associated with the fuel injection pump drive shaft 132 is detected as an electric signal by an electromagnetic pickup 101a, a pulse signal $v_N$ having a frequency proportional to the engine speed is generated from the signal generator 220, and then a voltage signal or rotational speed signal $V_N$ proportional to the engine rotational speed is generated through a known type of F-V converter circuit 221.

In this embodiment, the divider 230 comprises a conventional analog type divider which performs the operation of division with the flow signal $V_F$ as a dividend and the rotational speed signal $V_N$ as a divisor, thereby generating an actual fuel injection quantity signal $V_D$ ($V_D \propto V_F/V_N$) corresponding to the fuel injection quantity per injection stroke of the fuel injection pump 7.

Figure 9:
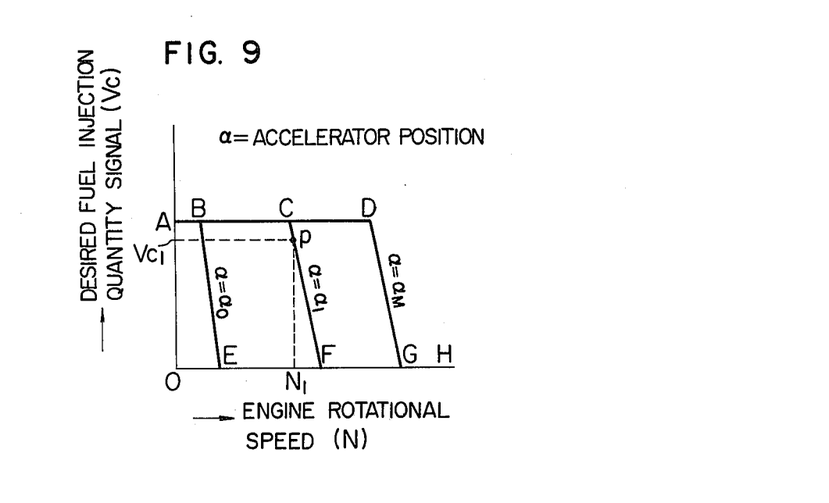

The desired fuel injection quantity signal generator 240 is responsive to the engine operating conditions to generate a desired fuel injection quantity signal $V_c$ corresponding to the desired fuel injection quantity per injection stroke. In this embodiment, the desired fuel injection quantity is computed by using signals representing the rotational speed and the accelerator position as the engine operating conditions. Numeral 102a designates a potentiometer for detecting the position of the accelerator to generate an accelerator position signal $V_\alpha$ corresponding to the accelerator position, or the amount of operation of the accelerator $\alpha$. Numeral 241 designates an operational amplifier which receives the rotational speed signal $V_N$ as an inverting input signal and the accelerator position signal $V_\alpha$ from the potentiometer 102a as a non-inverting input signal to generate a desired fuel injection quantity signal $V_c$ representing a basic desired fuel injection quantity characteristic having an all-speed governor characteristic as shown in FIG. 9. In the Figure, the parameter $\alpha$ represents the accelerator position, the abscissa N represents the engine rotational speed and the ordinate $V_c$ represents the desired fuel injection quantity signal. When the accelerator position, or the amount of operation of the accelerator is minimum, namely when $\alpha = \alpha_o$, a desired fuel injection quantity signal of a function voltage along the curve A-B-E-F-G-H is generated. When the accelerator position, or the amount of operation of the accelerator is maximum, namely when $\alpha = \alpha_M$, a desired fuel injection quantity signal of a function voltage along the curve A-B-C-D-G-H is generated. When the accelerator position or the amount of operation of the accelerator $\alpha = \alpha_I$ ($\alpha_o < \alpha_I < \alpha_M$), a desired fuel injection quantity signal of a function voltage along the curve A-B-C-F-G-H is generated.

The error discriminator 250 compares the actual fuel injection quantity signal $V_D$ with the desired fuel injection quantity signal $V_c$ to determine an error between both signals and thereby to generate an error discrimination signal. In this embodiment, in order to obtain an output voltage in the form of a pulse width signal having a duty cycle corresponding to the error between the desired fuel injection quantity signal $V_c$ and the actual fuel injection quantity signal $V_D$, the sawtooth signal from the sawtooth generator 260 is applied to and superimposed on the desired fuel injection quantity signal $V_c$ to provide a non-inverting input signal to an operational amplifier or comparator 251 and the actual fuel injection quantity signal $V_D$ is applied as an inverting input signal thereto. The resultant error discrimination signal is amplified by a transistor 270 and then applied to the exciting coil 52 of the electric servo motor 5. Then, the electric servo motor 5 produces an operation output corresponding to the error discrimination signal to correct the error or the deviation of the actual fuel injection quantity from the desired fuel injection quantity.

The effective value of the exciting current of the electric servo motor 5 varies with the value of the duty cycle of the exciting current, so that the generated electromagnetic force varies correspondingly and the link-coupled fuel injection quantity controlling member 6 of the fuel injection pump 7 is actuated to control the fuel injection quantity. Further, in this embodiment, the amount of operation of the electric servo motor 5 is detected as a voltage $V_p$ by a potentiometer 58, and a differentiating capacitor 59 generates a differentiation signal to feed it back to the non-inverting input circuit to the operational amplifier 251 in the error discriminator 250, thereby improving the stability of the servo system.

With the construction described above, the operation of the embodiment is performed as follows. When the engine rotational speed $N = N_l$ and the accelerator position or the amount of operation of the accelerator $\alpha = \alpha_l$, the rotational speed signal generator 220 generates a rotational speed signal $V_{Nl}$, and the accelerator position sensor 102 generates an accelerator position signal $V_{\alpha l}$, and both signals are then applied to the desired fuel injection quantity signal generator 240 which in turn generates a desired fuel injection quantity signal $V_{cl}$ corresponding to the operating point P shown in FIG. 9. At this time, the quantity of fuel supplied to the engine by the fuel injection pump 7 is converted into a fuel flow signal $V_F$ by the fuel flow signal generator 210 and then the fuel flow signal $V_F$ is divided by the rotational speed signal $V_N$ in the divider 230 to produce an actual fuel injection quantity signal $V_D$. Then, the error or deviation of the actual fuel injection quantity signal $V_D$ from the desired fuel injection quantity signal $V_{cl}$ is detected by the error discriminator 250 to produce a drive output signal having a duty cycle corresponding to the error, and, after the amplification thereof by the output transistor 270, the drive output signal is applied to the electric servo motor exciting coil 52 thereby to actuate the fuel injection quantity controlling element 6 of the fuel injection pump 7. In this way, the actual fuel injection quantity is corrected using the desired fuel injection quantity as the desired value.

While the electric control circuit shown in FIG. 8 illustrates the desired fuel injection quantity signal generator 240 as one satisfying the most basic all-speed governor characteristic which represents the full load fuel injection quantity, partial load fuel injection quantity and no load fuel injection quantity of the engine, it is possible to add a correction signal generating circuit having an fuel injection quantity correcting function in accordance with temperature, pressure, etc., a starting enrichment function and the like so as to generate desired fuel injection quantity signals which satisfy the required fuel injection quantity characteristic of the engine in a closer manner. However, the details of such a circuit do not fall within the object of this invention and will not be described any more.

Figure 10:
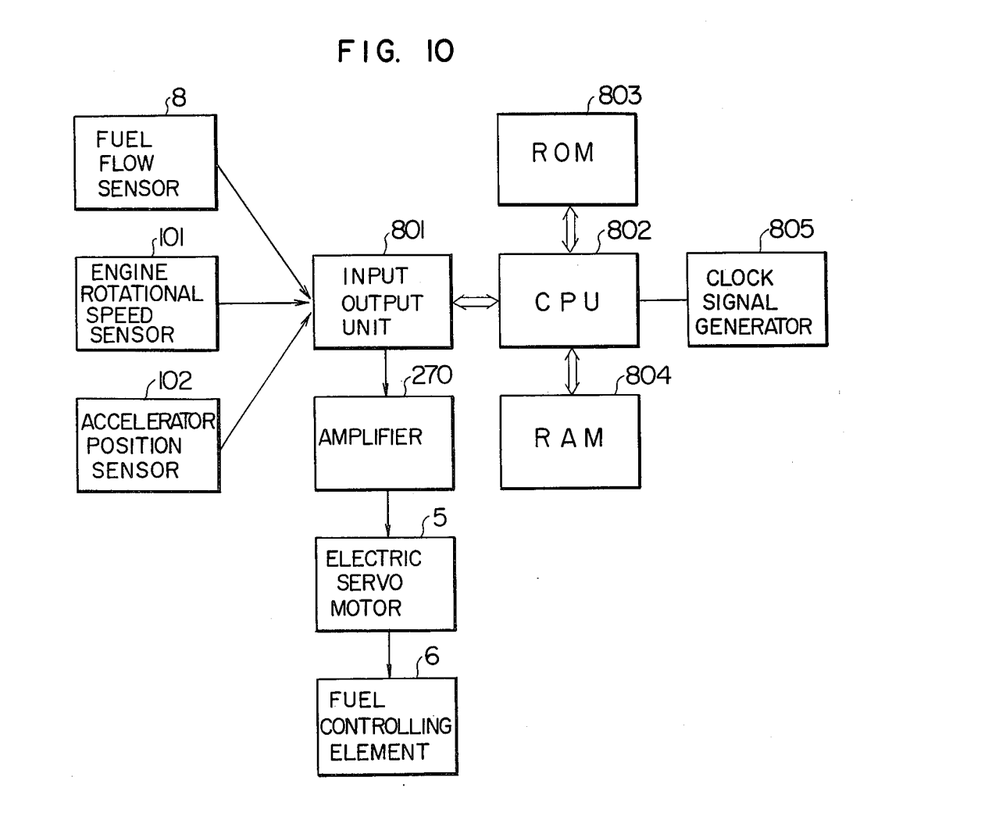
FIG. 10 is a block diagram schematically showing the construction of an electric control circuit of another embodiment of this invention.

While FIG. 8 illustrates by way of example an electric control circuit designed so that the operating conditions of an engine are detected and the desired value of the fuel injection quantity is computed by the analog type computing circuit, it is possible to use a modified form of the electric control circuit in which the desired value is computed by digital type processing means or microcomputer as shown in FIG. 10.

In FIG. 10, numeral 101 designates an engine rotational speed sensor, 102 an accelerator position sensor, and 8 a fuel flow sensor, and these sensors are identical in the construction with their equivalents shown in FIG. 8. Numeral 801 designates an input output unit (hereinafter referred to as I/O U), which, in this embodiment, has an input signal processing function including counters for counting the signals indicative of the rotational speed N and fuel flow F which are detected as digital signals, A-D converters for effecting A-D conversion of analog signals such as an accelerator position signal and the like devices, and an output signal processing function including a counter for converting the computation result into a duty cycle of a pulse signal for actuating the electric servo motor 5 and the like devices. Numeral 802 designates a central processing unit (hereinafter simply referred to as CPU) for performing necessary computing operations in accordance with a predetermined computing program, in which, for instance, the quantity of fuel actually injected into the engine for every injection stroke of the fuel injection pump 7, namely, the actual fuel injection quantity Q is computed from the engine rotational speed N and the fuel flow rate F in accordance with the relationship $Q=k\cdot F/N$ (where k is a constant). Also, the desired fuel injection quantity G is computed in accordance with the operating condition input signals indicative of the engine rotational speed N from the engine rotational speed sensor 101, the accelerator position $\alpha$ from the accelerator position sensor 102, etc., and the error or the deviation of the actual fuel injection quantity Q from the desired fuel injection quantity G is computed, and then the I/O U 801 produces a conversion pulse signal whose duty cycle varies with the error. This pulse signal is amplified by an amplifier 270 and then supplied to an electric servo motor 5 which drives an injection pump fuel controlling element 6, thereby correcting the error or deviation of the actual fuel injection quantity from the desired fuel injection quantity.

Numeral 803 designates a read-only memory (hereinafter simply referred to as ROM) for storing a processing program and necessary data for computing operations. Numeral 804 designates a read/write memory (hereinafter simply referred to as RAM) for temporarily storing various data and computation results. The I/O U 801, the CPU 802, the ROM 803 and the RAM 804 transfer data from one to another through a bidirectional bus line. Numeral 805 designates a clock signal generator for generating clock signals for use in the CPU 802. The amplifier 270 and the electric servo motor 5, which are identical with those shown in FIGS. 8 and 6, respectively, may be used.

Figure 11:
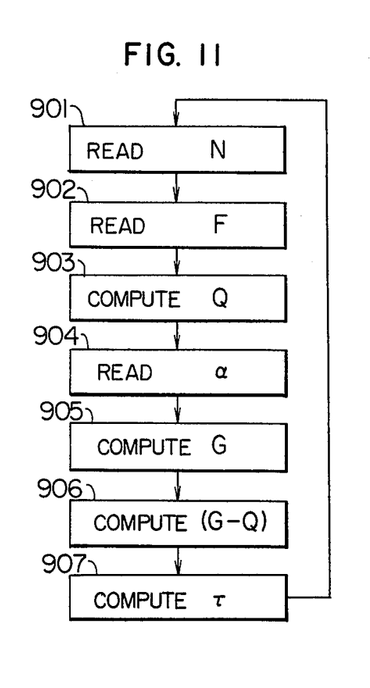
FIG. 11 is a flow chart showing the processing steps of the electric control circuit shown in FIG. 10.
Figure 12:
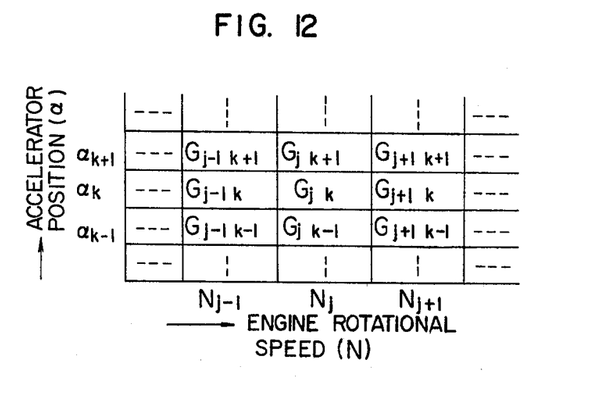
FIGS. 12 and 13 are diagrams for explaining the table used to determine the desired fuel injection quantities and the time widths of drive pulse signals, respectively.

FIG. 11 is a flow chart showing the processing steps of the microcomputer type electric control circuit shown in FIG. 10. In the steps 901 and 902, the CPU 802 reads the engine rotational speed N and the fuel flow F, respectively, which were detected by the engine rotational speed sensor 101 and the fuel flow sensor 8, through the I/O U 801, and temporarily stores them in the RAM 804. In the step 903, the CPU 802 computes the actual fuel injection quantity $Q=k\cdot F/N$ (where k is a constant) from the engine rotational speed N and the fuel flow F stored in the RAM 804, and stores the result in the RAM 804. In the step 904, the accelerator position sensor 102 detects the accelerator position $\alpha$, which is stored temporarily in the RAM 804 via the I/O U 801. In the step 905, the CPU 802 makes a search in the desired fuel injection quantity table stored in the ROM 803, and computes from the table the desired fuel injection quantity G corresponding to the detected engine rotational speed N and accelerator position $\alpha$. FIG. 12 shows an example of the table of the desired fuel injection quantity G. When the engine rotational speed N is equal to $N_j$ and the accelerator position $\alpha$ is equal to $\alpha_k$, it is possible to obtain the result of computation of the desired fuel injection quantity $G=G_{jk}$ by making a data search in the table by the table look-up method.

If the values N and $\alpha$ deviate in some degree from the values $N_j$ and $\alpha_k$, respectively, it is still possible to obtain the desired fuel injection quantity G by using the known linear interpolation method or the like. The desired fuel injection quantity G thus obtained is temporarily stored in the RAM 804. In the step 906, the CPU 802 computes the fuel injection quantity error $(G-Q)$ from the desired fuel injection quantity G and the actual fuel injection quantity Q and temporarily stores the result in the RAM 804. In the step 907, the computation of the drive pulse time width $\tau$ corresponding to the fuel injection quantity error is effected similarly by the table look-up method using the table shown in FIG. 13 by way of example and the result of the computation is sent to the I/O U 801 which in turn generates a drive pulse signal of the time width $\tau$ by the event counter comprised therein. The drive pulse signal is amplified by the amplifier 270 and then supplied to the electric servo motor 5. The electric servo motor 5 generates an actuation force for actuating the fuel injection quantity controlling element 6 of the fuel injection pump 7 thereby to correct the error between the desired fuel injection quantity and the actual fuel injection quantity.

Figure 13:
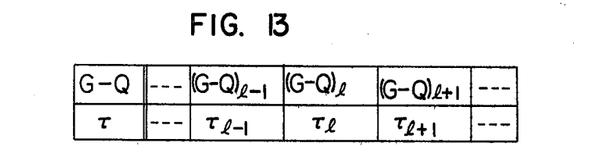

The table in FIG. 13 shows the relation between the fuel injection quantity error $(G-Q)$ and the drive pulse time width τ. When $(G-Q)=(G-Q)_l$, $τ=τ_l$ is computed. If the value of the fuel injection quantity error $(G-Q)$ deviates somewhat from the value $(G-Q)_l$, it is still possible to obtain the desired time width τ with high precision by using the linear interpolation method. It is a matter of course that the electric servo device responsive to the drive output of the electric control circuit to produce an actuation force for driving the fuel injection quantity controlling element 6 of the fuel injection pump 7 is not limited to the electric servo motor 5 as used in this embodiment, but various other servo devices such as an electro-hydraulic servo device, etc. may be used.

Figure 14:
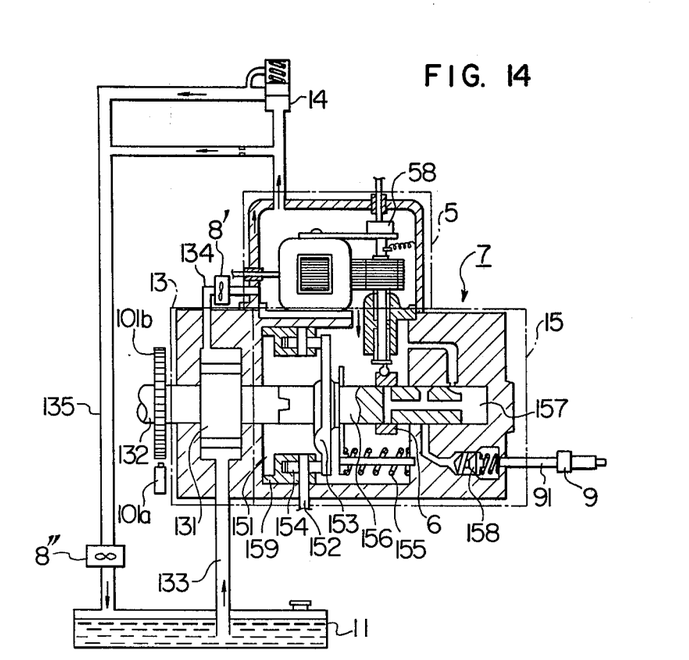
FIG. 14 is a sectional view showing the construction of a distributor type fuel injection pump which is controlled by the electric control apparatus of still another embodiment of this invention.
Figure 15:
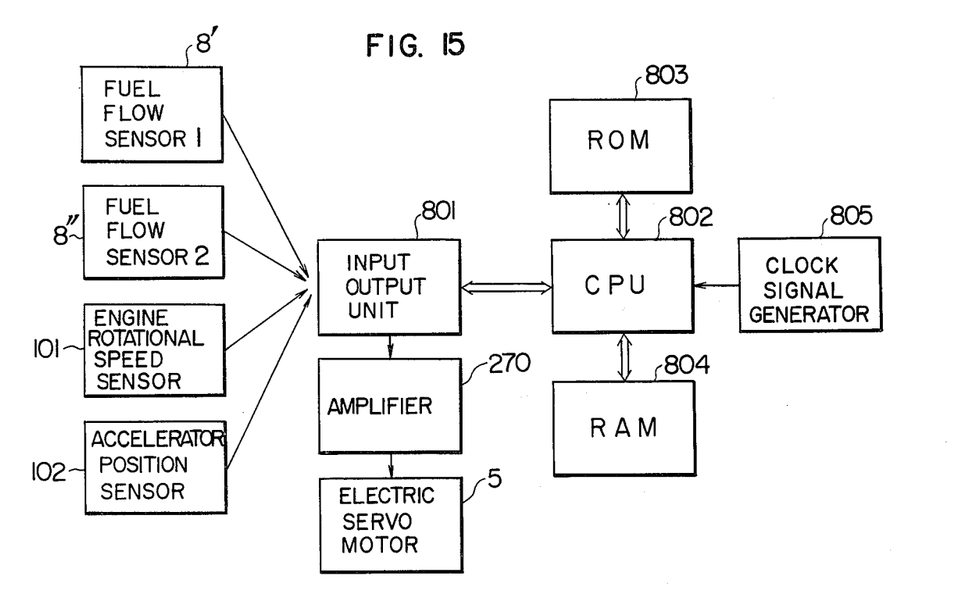
FIG. 15 is a block diagram schematically showing the construction of the electric control circuit for use in the embodiment shown in FIG. 14.

In the case of another embodiment of the invention shown in FIG. 14 in which the fuel passage communicating with the inside space of the housing of the electric servo motor 5 is divided into two passages comprising the delivery passage 134 of the vane pump 131 and the return passage 135, two fuel flow sensors 8' and 8" are disposed in the passages 134 and 135, respectively, and the difference $(F'-F'')$ between the two fuel flow rates F' and F" detected by the fuel flow sensors 8' and 8", respectively, is computed to give the injection fuel flow rate, whereby it is posssible to accomplish computation in a manner similar to the first embodiment. As shown in FIG. 15 by way of example, the construction of the processing system including a microcomputer used in this case is identical with one shown in FIG. 10, except that the two fuel flow sensors 8' and 8" are used in place of the single fuel flow sensor 8.

Figure 16:
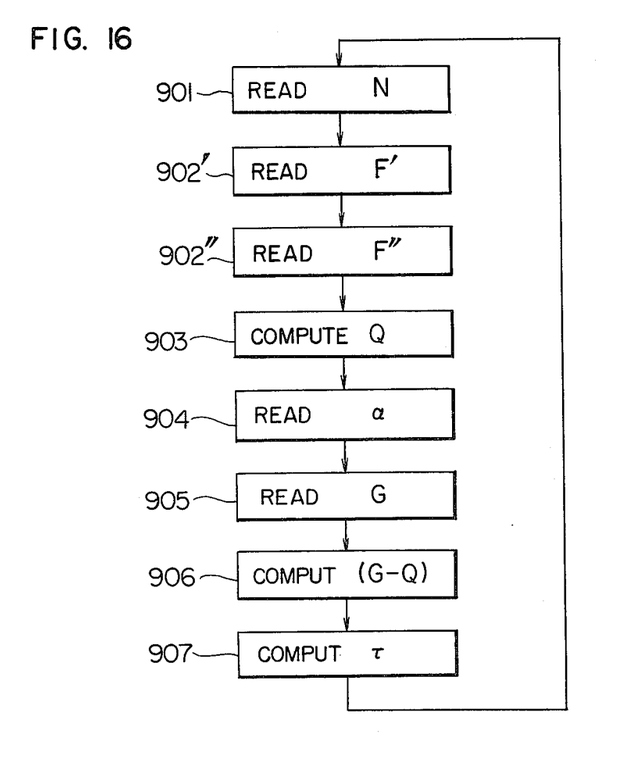
FIG. 16 is a flow chart showing the processing steps of the electric control circuit shown in FIG. 15.

As shown in FIG. 16, the flow chart for processing steps in this case is identical with that shown in FIG. 11 except that two fuel flow read steps 902' and 902" are used corresponding to the two fuel flow sensors 8' and 8", respectively, and that the actual fuel injection quantity is computed at the step 903 in accordance with the relation: $Q=k(F'-F'')/N$ (where k is a constant).

Thus, it will be seen from the foregoing that, in accordance with the invention, by virtue of the fact that the effective quantity of fuel supply to the inlet side of a fuel injection pump is detected by a fuel flow sensor or fuel flow sensors, that the operating conditions such as the engine rotational speed, the accelerator position, etc. are detected as electric signals, that an electric control circuit computes the actual fuel injection quantity and the desired fuel injection quantity and then computes the error or deviation therebetween thereby to generate a drive output corresponding to the error signal, and that, in response to the drive output, an electric servo motor drives a fuel injection quantity controlling element to correct the deviation of the actual fuel injection quantity from the desired fuel injection quantity, the program control of the fuel injection quantity can be accomplished with high precision as the precision of detection by the fuel flow sensor is elevated, thereby bringing a remarkable effect in the control of fuel injection pumps.

We claim:

1. An electric control apparatus for fuel injection pumps of an internal combustion engine comprising:
    a fuel injection pump;
    fuel flow sensor means for generating a fuel flow signal indicative of a net quantity of fuel flow supplied to said fuel injection pump;
    operating condition sensor means for detecting operating condition parameters of said engine and generating detection signals;
    servo means for actuating a fuel injection quantity controlling element of said fuel injection pump which controls the quantity of fuel injected by said fuel injection pump;
    electric control circuit means including means for computing an actual fuel injection quantity and generating an actual fuel injection quantity indicative signal, means for computing a desired fuel injection quantity in accordance with the fuel flow signal from said fuel flow sensor means and the detection signals from said operating condition sensor means and generating a desired fuel injection quantity indicative signal, means for receiving the actual fuel injection quantity indicative signal and said desired fuel injection quantity indicative signal, detecting a difference between both signals and generating an error signal corresponding to the difference, and a drive circuit responsive to the error signal to energize said servo means and thereby to actuate said fuel injection quantity controlling element of said fuel injection pump, thereby controlling the actual fuel injection quantity at said desired fuel injection quantity; and
    feedback means for generating a feedback signal in proportion to a differentiation of an actuation output of said servo means and algebraically adding the feedback signal to the desired fuel injection quantity indicative signal received by said error signal generating means.

2. An electric control apparatus according to claim 1, wherein said actual fuel injection quantity computing means includes a divider for dividing the fuel flow signal from said fuel flow sensor by an engine rotational speed signal from said operating condition sensor means.

3. An electric control apparatus according to claim 1, wherein said desired fuel injection quantity computing circuit includes an operational amplifier for receiving an accelerator position detection signal at one input terminal thereof and an engine rotational speed detection signal at another input terminal thereof from said operating condition sensor means.

4. An electric control apparatus according to claim 1, wherein said error signal discriminating means includes an operational amplifier for receiving both said signals at input circuits thereto and comparing both signals with each other.

5. An electric control apparatus according to claim 1, wherein said fuel injection pump includes a high pressure fuel pump section and a low pressure fuel pump section, said low pressure fuel pump section including an inlet passage and a delivery passage, said inlet passage communicating with a fuel tank and said delivery passage being divided into two branch passages, one of said branch passages being connected to a fuel relief return passage communicating with said fuel tank and the other of said branch passages being connected to a fuel supply passage leading to said high pressure fuel pump section, and wherein said fuel flow sensor means is disposed in said fuel supply passage.

6. An electric control apparatus according to claim 1, wherein said fuel injection pump includes a high pressure fuel pump section and a low pressure fuel pump section, said low pressure fuel pump section including an inlet passage communicating with a fuel tank and a delivery passage connected to a fuel inlet path leading to said high pressure fuel pump section, said fuel inlet path being further connected to said fuel tank through a fuel relief return passage, and wherein said fuel flow sensor means comprises two flow sensors respectively disposed in said delivery passage and said fuel relief return passage, and wherein said net quantity of fuel flow is determined by the difference between fuel flow signals from said fuel flow sensors.

* * * * *